United States Patent [19]

Lorello et al.

[11] Patent Number: 4,560,046

[45] Date of Patent: Dec. 24, 1985

[54] DOOR OPERATOR

[76] Inventors: Mark M. Lorello, 407 Wyleswood, Berea, Ohio 44017; Günter F. Plamper, 90 Surrey Dr., Brunswick, Ohio 44212

[21] Appl. No.: 589,738

[22] Filed: Mar. 15, 1984

[51] Int. Cl.[4] ..................... F16D 13/76; A01D 69/10; F16H 57/10

[52] U.S. Cl. ..................................... 192/11; 56/11.6; 474/115

[58] Field of Search ........................ 192/10, 11, 17 R; 474/114, 115; 56/11.6

[56] References Cited

U.S. PATENT DOCUMENTS

| | | | |
|---|---|---|---|
| 3,636,786 | 1/1972 | Buck | 474/114 |
| 4,068,452 | 1/1978 | Schaefer et al. | 56/11.6 |
| 4,409,779 | 10/1983 | Bent | 192/11 |

*Primary Examiner*—George H. Krizmanich
*Attorney, Agent, or Firm*—Woodling, Krost, Rust & Hochberg

[57] ABSTRACT

A door operator mechanism which has a motive power source and drive and a manual drive for use with a manual source of power. A mechanism is included which by the simple expedient of pulling a chain or cable disconnects the power source and associated driver and connects the manual drive for use of a manual source of power. Release of the cable causes the reverse.

7 Claims, 10 Drawing Figures

DOOR OPERATOR

FIELD TO WHICH INVENTION RELATES

The present invention relates in general to garage door operators and more particularly to a design wherein an electrical power source and a mechanically actuated power source can be conveniently alternately connected and disconnected to a drive train mechanism which is mechanically connected to the door for moving the same.

It is often desirable to be able to quickly and conveniently disconnect an electrical drive mechanism from a door driven thereby to enable one to mechanically move the door between raised and lowered positions. The art has accomplished this in many and varied ways in the past; however, the mechanisms, particularly those used to operate heavy commercial doors, have been complicated, unwieldy and at times unreliable.

The present invention seeks to obviate the above disadvantages of the prior art and provides a safe and reliable mechanism for accomplishing the desired end result.

An object of the present invention is to provide a garage door operator which includes means by which with a pull on a single chain or member, an electrical drive source is disconnected and a mechanically actuated drive source is connected and release of the chain causes the reverse.

Another object of the present invention is to provide in a garage door operator an electrically actuated drive train wherein movement of the mounting for an electrical motor serves to disconnect the motor drive and also release a brake mechanism which is normally biased to locked or actuated position.

Another object of the present invention is to provide in a garage door operator a unique mechanism for actuating and deactuating a manually actuable sprocket used for manually raising and lowering a garage door.

A still further object of the present invention is to provide in a garage door operator a cable and cable guide mechanism which enable the cable to be pulled or actuated in a number of directions to perform the function of actuating and deactuating electrical and mechanically actuated drive sources.

Other objects and advantages may be observed from the following description taken in conjunction with the several drawings.

FIGURES OF THE DRAWINGS

DESCRIPTION OF THE INVENTION HEREIN DISCLOSED

Figure 1:
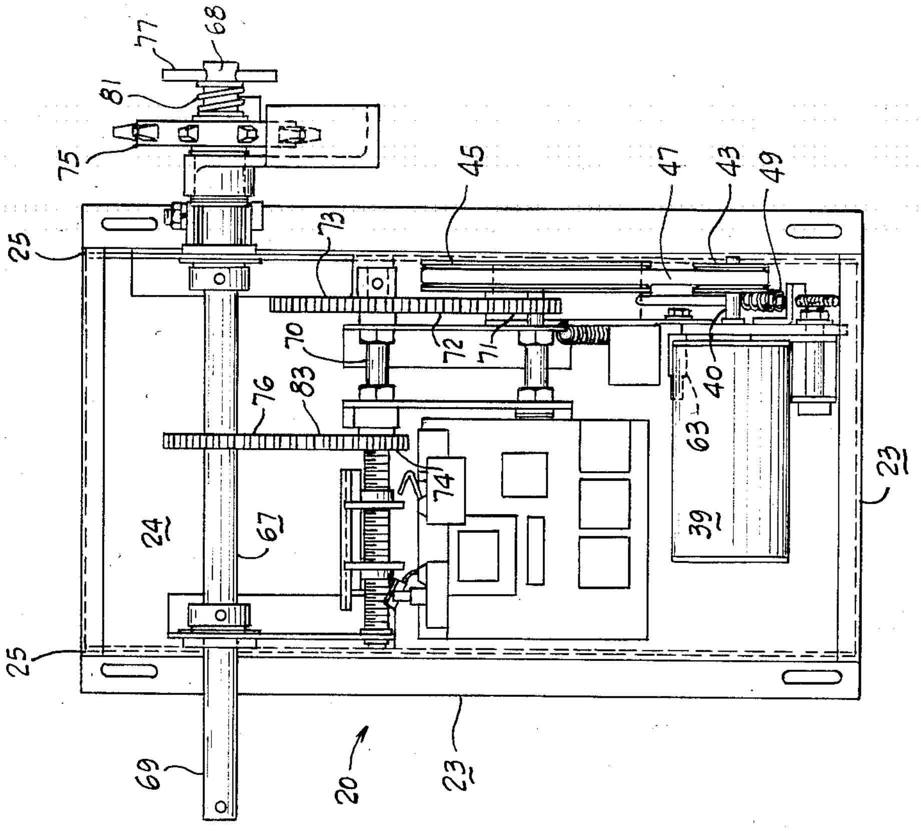
FIG. 1 is a front plan view of the door operator of the present invention with the housing cover removed for ease of illustrating the parts.

The door operator of the present invention has been indicated generally by the reference numeral 20 in the drawings and FIG. 1 best illustrates the orientation of the door operator mechanism as it would be normally mounted on a vertically extending support wall adjacent a door to be operated by the mechanism. The door operator mechanism is mechanically attached to a door to be opened and closed in a conventional manner and so therefore the mechanical connection between the operator and the door have not been illustrated herein.

The door operator 20 and the mechanical parts which comprise the same are contained within a housing 23 which includes as part thereof a backwall 24 and sidewalls 25. The internal mechanism of the operator is normally closed from view by means of a cover which is included in the housing but which has been omitted from the illustrations so as to provide for more convenient explanation of the device as described hereinafter.

A motor mounting bracket 30 is connected at a first end portion 31 to the backwall of the housing by pivot means 37. This enables the motor mounting bracket to be moved between first and second arcuately spaced positions illustrated respectively in FIGS. 7 and 8 of the drawings.

Figure 2:
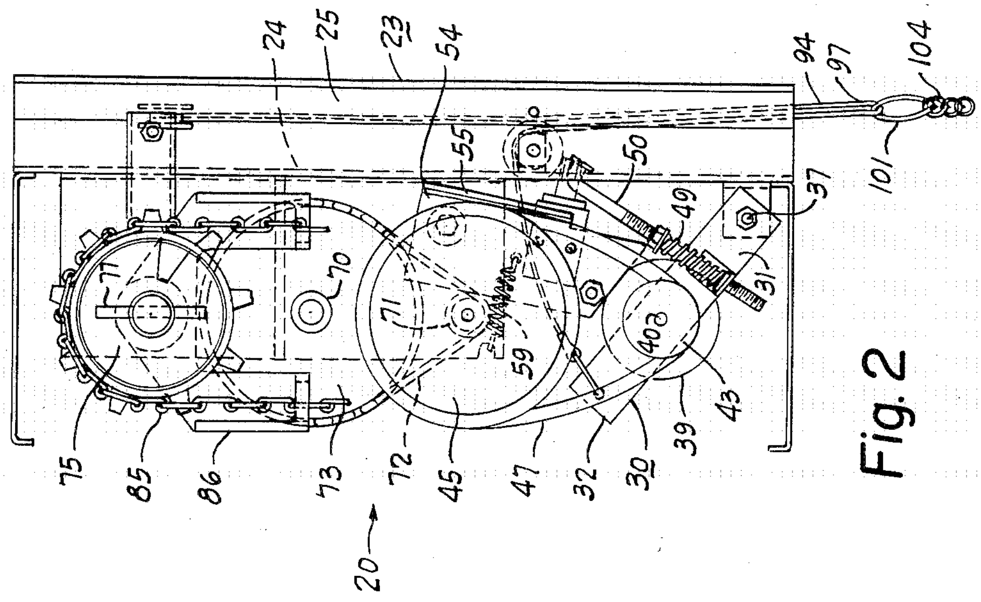
FIG. 2 is a view taken from the right side of FIG. 1.
Figure 7:
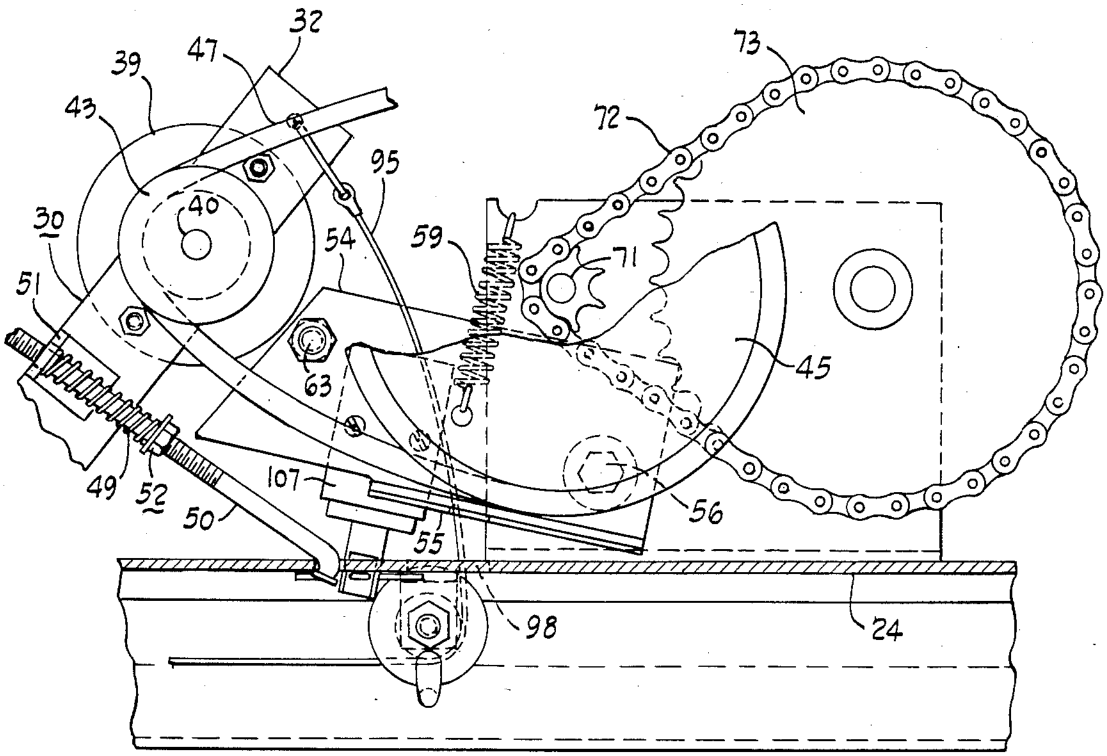
FIG. 7 is an enlarged fragmentary view taken in the direction of FIG. 2 and with the parts in the same position.

An electric motor 39 is mounted by an intermediate portion 33 of the bracket 30 and moves between the two positions of the motor bracket just described hereinabove. The electric motor is provided with a drive shaft 40 which in turn is rotatively connected to a drive pulley 43 which it rotatively drives. A driven pulley 45 is mounted for rotation on an axis substantially parallel to the axis of the drive shaft 40 as best seen in FIGS. 1 and 2 and a belt 47 drivingly interconnects the drive and driven pulleys 43 and 45 respectively. FIGS. 2 and 7 illustrate the positions of the various parts whereby rotational movement of the motor shaft causes the drive pulley to rotatively drive the driven pulley 43 when a brake has been released.

The motor bracket 30 is constantly urged in a first direction about said pivot means 37 by means of a first spring means 49 in a direction to tighten the engagement of the drive belt 47 with the pulleys 43 and 45. The mounting of the spring means so as to accomplish the function just described will be apparent from viewing the drawings and includes a rod 50 which is pivotally connected at its lower end to the backwall 24 and which extends through the coil of the spring which is part of the spring means 49. One end of the spring engages a nut—washer construction 52 with this nut portion of this construction threadably connected to the rod and with the other end of the spring engaging a tab 51 which is fixedly secured to the bracket 30 and with the rod 50 extending through an opening in the tab 51. This construction assures a constant urging of the bracket 30 to a position where the belt 47 will cause driving engagement between pulleys 43 and 45.

A brake bracket 54 which has a brake shoe portion 55 is pivotally connected to the housing at 56. It will be noted particularly from FIGS. 2, 7 and 8 that the brake shoe portion 55 is located adjacent the belt 47 where it engages the lowermost portion of the driven pulley 45.

Figure 8:
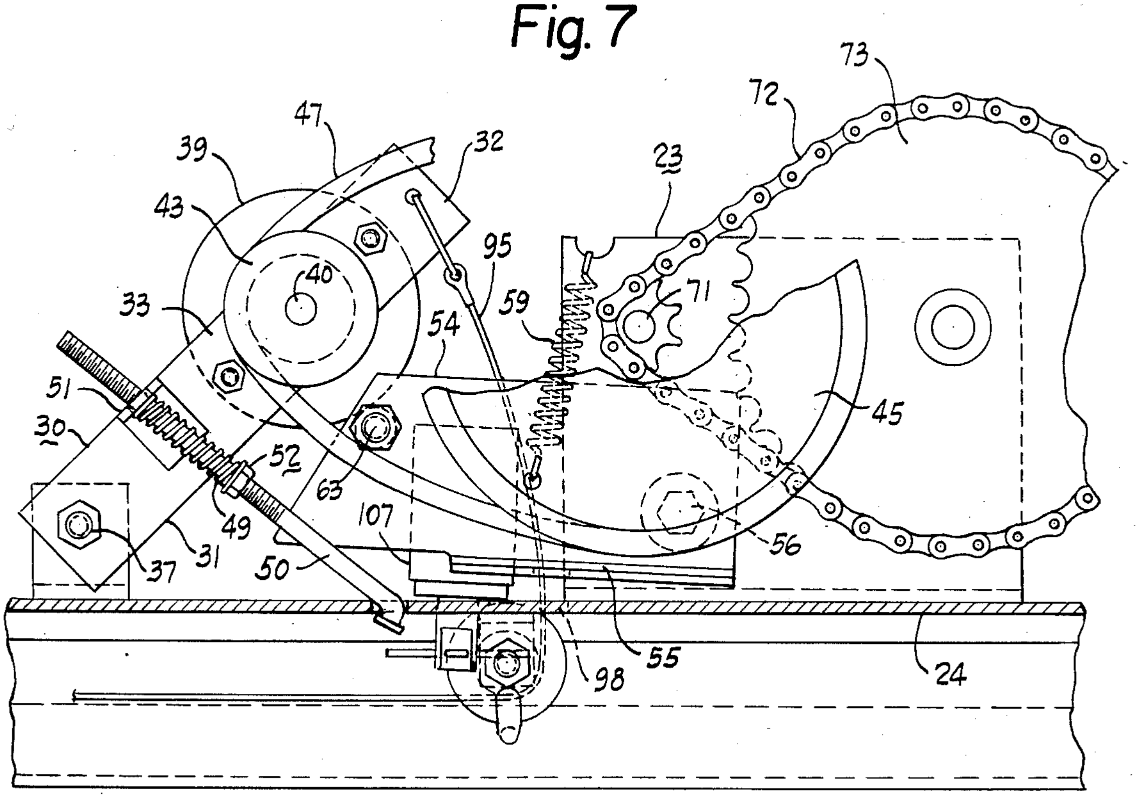
FIG. 8 is the view of FIG. 7 with the parts in another position.

The brake shoe portion is in braking engagement with the belt 47 in FIGS. 2 and 7 and is out of engagement in FIG. 8. The brake bracket is constantly urged in a direction about pivot 56 so as to cause engagement of the brake shoe portion by means of a second spring means 59 which is secured at one end to the brake bracket 54 and at its other end to the housing 23.

A brake bracket pin 63 is secured and carried by the brake bracket 54 in a position adjacent the electric motor 39 whereby movement of the motor bracket 30 in a direction in opposition to the urging of the first spring means 49, causes the motor to engage the pin 63 and to pivot the brake bracket against the urging of the second spring means 59 to disengage the brake shoe and release the rotationally retarding force on the driven pulley 45. This position is illustrated in FIG. 8.

A jack shaft 67 which has first and second end portions 68 and 69, respectively, is illustrated in the drawings and is mounted for rotation on bearings in the housing at an end of the housing opposite the electric motor 39. The jack shaft 67 is connected to the driven pulley 45 by what may broadly be referred to as drive train means. The drive train means includes sprockets 71, 73, 74,76 and drive chains 72 and 83 which interconnect these sprockets in the manner illustrated. Sprockets 73 and 74 are mounted on shaft 70 and sprocket 76 is mounted on an intermediate portion of shaft 67.

The second end portion 69 is adapted to be mechanically connected to the mechanism which raises and lowers a door to be operated. Since this mechanism for operably connecting the jack shaft or equivalent structure to a door is well known to those skilled in the art, it has not been illustrated herein.

Figure 5:
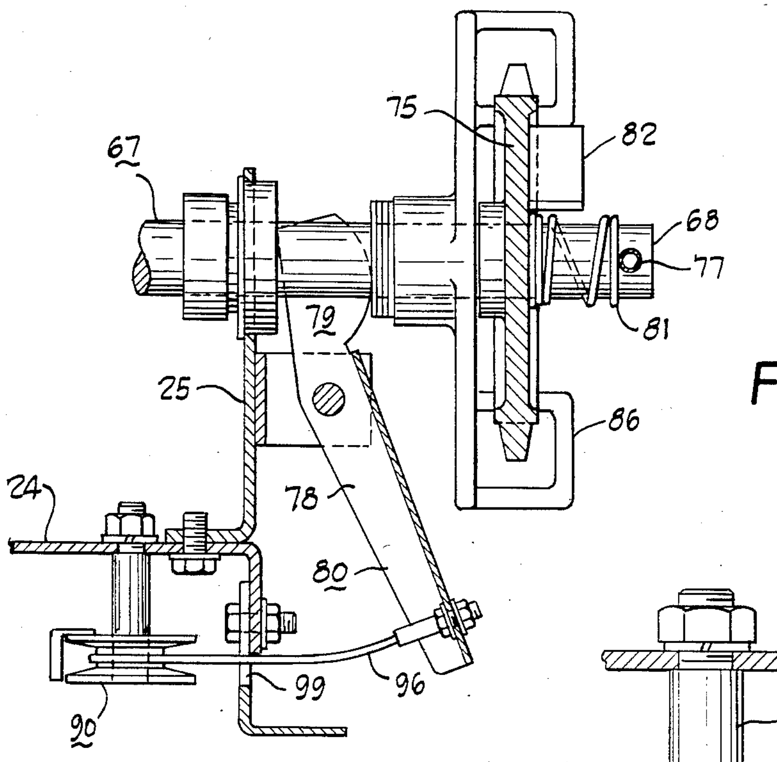
FIG. 5 is a view taken generally along the line 5—5 of FIG. 4.
Figure 6:
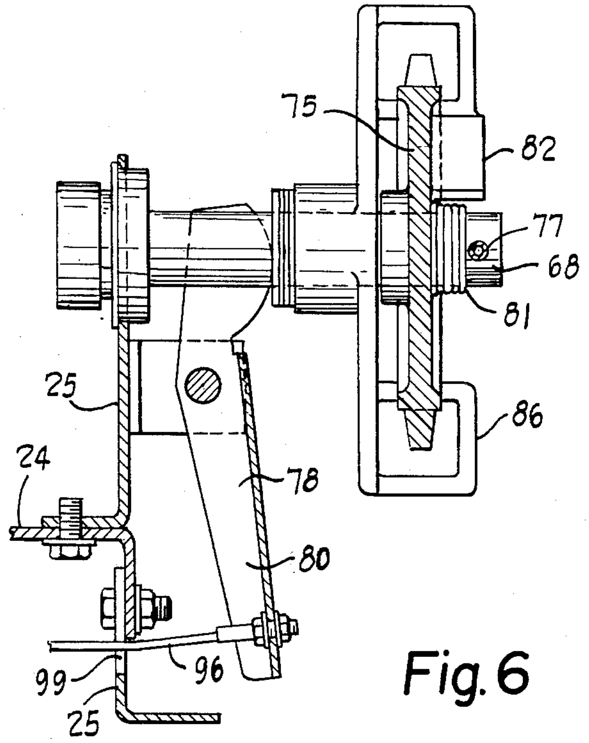
FIG. 6 is the view of FIG. 5 with the parts in another position.

A manually rotatable sprocket 75 is mounted on the first end portion 68 of shaft 67 and is adapted to move axially between first and second positions thereon which positions are illustrated respectively in FIGS. 5 and 6 of the drawings. FIG. 6 illustrates the position of the sprocket where it is rotatively connected to shaft 67 and FIG. 5 illustrates the position of the sprocket 67 where the sprocket is freely rotatable on and with respect to the shaft 67. A drive pin 77 extends diametrically through the extreme end of the first end portion 68 of shaft 67 and a spring 81 extends between pin 77 and the sprocket constantly urging the sprocket in an axial direction so as to cause the sprocket to be rotatively disconnected (FIG. 5) from the shaft 67. A pivotally mounted shift lever 78 is provided with a first end portion 79 being located adjacent the sprocket 75 whereby pivotal movement of the lever 78 causes the sprocket to move to the position of FIG. 6 where a drive shoulder 82 on the sprocket engages the drive pin 77 and in this position the sprocket and shaft are rotationally locked together. A hand chain 85 extends around the sprocket 75 and extends toward the floor to a position where an operator can manually rotate the sprocket when it is desired to manually and lower a door. A chain guide 86 serves to accommodate the two portions of the chain which extend over either side of the sprocket 75 so as to prevent the chain from inadvertently being dislodged from the sprocket.

Figure 3:
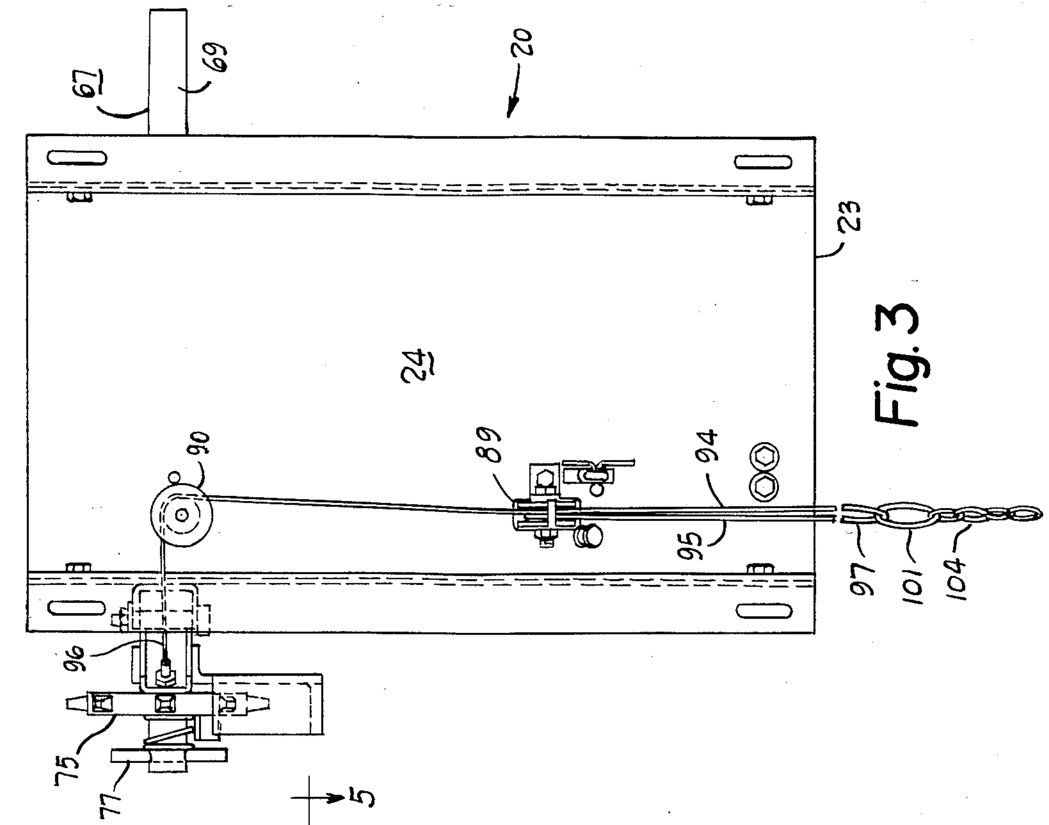
FIG. 3 is a rear plan view of the door operator taken in a direction opposite to FIG. 1.
Figure 4:
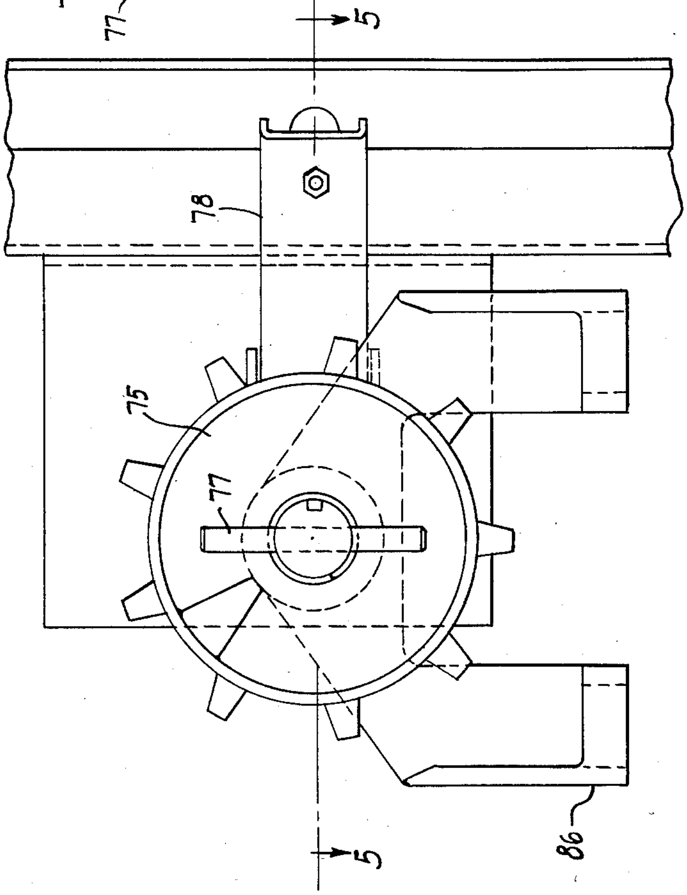
FIG. 4 is an enlarged fragmentary view of a portion of the door operator taken in the direction of FIG. 2.
Figure 9:
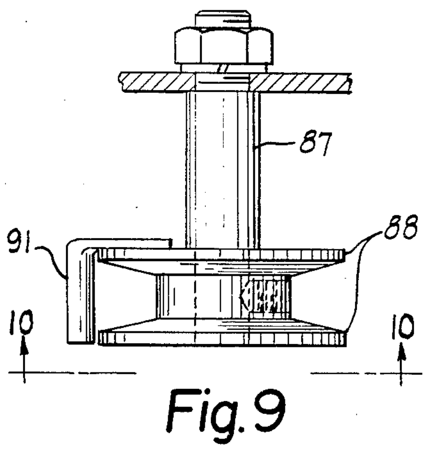
FIG. 9 is an enlarged elevational view of a cable guide shown in FIG. 3.
Figure 10:
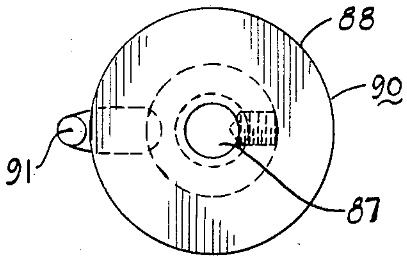
FIG. 10 is a view taken generally along the line 10—10 of FIG. 9.

First and second cable guides 89 and 90 (FIGS. 3, 9 and 10) are mounted on the housing backwall 24 on the outside of the housing or in other words on the side of the backwall 24 opposite the location of the mechanism previously described. The first and second cable guides have axes which extend generally at right angles to each other with the first cable guide being located in the general area of the motor mounting bracket 30 and with the second cable guide being located in the general area of the second end portion 80 of the pivotally mounted shift lever member 78. Each cable guide has a shaft 87 which connects it to the housing and two flanges 88 between which the cable extends. A member 91 keeps the cable trapped in the guide.

A one piece cable 94 is provided which has first and second end portions 95 and 96 respectively, and an intermediate portion 97. The first end portion 95 of the cable 94 extends around the first cable guide 89 and through an opening 98 in the backwall 24 and is connected to the second end portion 32 of the bracket 30 as illustrated in FIGS. 2, 7 and 8. The second end portion 96 of the cable 94 extends around the second cable guide 90 and through an opening 99 in the sidewall 25 and is connected to the second end portion 80 of the shift lever member 78 as best illustrated in FIGS. 5 and 6. The intermediate portion 97 of the continuous cable 94 is provided with a ring member 101 or cable pulley to is connected a chain 104 of sufficient length that an operator standing at ground level can pull on the chain which in turn causes the bracket 30 to move about its pivotal mounting to the position of FIG. 8 to loosen the belt 47 which causes the brake shoe to become disengaged and which also causes the sprocket 75 to move to the position of FIG. 6 to rotatably connect the sprocket to the jack shaft 67.

It will thus be seen that the objects and end results desired by the present invention are uniquely and conveniently carried out.

To repeat briefly, by the convenient means of exerting a force on chain 104, the bracket mounting the electric motor is caused to be pivoted loosening belt 47 and in effect declutching the motive power operated portion of the door operator and the movement of the electric motor 39 causes the brake shoe 55 to be released. At the same time the sprocket 75 is rotatably engaged with the jack shaft so that the jack shaft can be conveniently manually rotated by the hand chain 85. This enables the garage door being serviced by the operator mechanism 20 to be manually manipulated by a person standing at floor level with the electric motor 39 being conveniently disconnected. To disconnect the manually operated hand chain 85 one need simply release the force on chain 104 which causes the bracket 30 to move back to the position of FIG. 2 with the brake shoe portion 55 braking the movement of the driven pulley 45.

It will be noted particularly in FIGS. 5 and 6 the construction of a solenoid 107 which has one end portion secured to the backwall 24 and with he other end portion secured to the brake bracket 54. The two extreme positions of the solenoid 107 are illustrated in FIGS. 7 and 8. The solenoid's function is to release the brake shoe portion from its braking function when the electric motor 39 is electrically actuated through circuitry not shown herein because it forms no part of the invention. In any event, when the electric motor is electrically actuated, the solenoid 107 is energized causing the bracket 54 and brake shoe portions to move to the position of FIG. 8 so that the electric motor may conveniently drive the jack shaft 67 with resultant raising or lowering of the garage door.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A door operator mechanism including in combination a housing having a backwall and a sidewall, a motor mounting bracket mounted on said backwall inside said housing and having first and second end portions and an intermediate portion, pivot means pivotally connecting said first end portion of said motor bracket to said housing, an electric motor carried by said motor bracket and having a drive shaft drivingly connected to a drive pulley, a driven pulley mounted for rotation on an axis parallel to said drive shaft, a belt drivingly interconnecting said drive and driven pulleys, a first spring means constantly urging said motor bracket in a first direction about said pivot means to tighten the engagement of said belt with said drive and driven pulleys, a brake bracket having a brake shoe portion and being pivotally connected to said housing, a second spring means connected to said brake bracket and constantly urging said brake shoe portion into engagement with said belt in the area of said driven pulley, a brake bracket pin secured by said brake bracket and located adjacent said electric motor whereby movement of said motor bracket in a second direction opposite to said first direction causes said motor to engage said brake bracket pin and pivot said brake bracket against the urging of said second spring means to disengage said brake shoe from said pulley and release the rotationally retarding force on said driven pulley, drive train means operably connecting said driven pulley to a rotatable jack shaft having first and second end portions, a manually rotatable sprocket mounted on said first end portion of said jack shaft and movable axially between first and second positions thereon, spring means urging said sprocket to said first position whereat it is freely rotatable relative to said jack shaft, a drive pin extending from said end portion of said jack shaft, a pivotally mounted shift lever having first and second end portions, said first end portion of said shift lever member being located adjacent said sprocket whereby pivoting of said shift lever causes said sprocket to move to said second position where said drive shoulder engages said drive pin and said jack shaft and said sprocket are rotationally locked together, a hand chain member connected to said sprocket for manually rotating the same, first and second cable guides mounted on said housing backwall outside said housing, said first and second cable guides having axes which extend generally at right angles to each other, said first cable guide being located in the general area of said motor mounting bracket and said second cable guide being located in the general area of said second end portion of said pivotally mounted shift lever member, a one piece cable having first and second end portion and an intermediate portion, said cable first end portion extending around said first cable guide and through an opening in said backwall and connected to said second end portion of said motor bracket, said cable second end portion extending around said second cable guide and through an opening in said sidewall and connected to said second end portion of said shift lever member, a chain connected to said intermediate portion of said cable by way of a ring member whereby the application of a force on said chain causes said motor bracket to move in a second direction to loosen said belt which in turn causes said brake shoe to become disengaged from said pulley and said sprocket moves to said second position to engage said drive shoulder with said drive pin.

2. A door operator mechanism including in combination a main shaft mounted for rotation and adapted to be driven from either a manual or electrical power source, a sprocket mounted on said main shaft for axial movement between first and second positions thereon, spring means urging said sprocket to said first position where it is rotatively disconnected from said main shaft, manually operable means for moving said sprocket to said second position where it is rotatively connected to said main shaft, a manually operable chain on said sprocket for rotating the same, an electric motor having a shaft drivingly connected to a drive pulley, means supporting said electric motor which permits said motor to be moved between first and second positions, a driven pulley, a belt extending between said drive and driven pulley to drivingly interconnect the two when said motor is in said first position and when said motor is in said second position loosening said belt to drivingly disconnect the two, a brake member engageable with said belt in the area of said driven pulley in a first position and movable to a second and disengaged position, said motor in said second position engaging said brake member to move same to said second and disengaged position, drive train means operably connecting said driven pulley to said main shaft, cable means connected to said means for supporting said electric motor and to said manually operable means for moving said sprocket which cable means when manipulated moves said electric motor to said second position to disengage said drive and driven pulleys and said brake member and to move said sprocket to said second position to rotatively connect same to said main shaft.

3. A door operator mechanism as claimed in claim 2 wherein said cable means comprises a continuous one piece cable member having first and second end portions, first and second cable guides, said first cable guide being located adjacent said means for supporting said electric motor and said second cable guide being located adjacent said manually operable means for moving said sprocket, said cable first end portion engaging said first cable guide and being attached to said means for supporting said electric motor, said cable second end portion engaging said second cable guide and being attached to said manually operable means for moving said sprocket.

4. A door operator mechanism as claimed in claim 3 wherein a ring member receives said cable member and a pull chain is connected to said ring for manipulating said cable member.

5. A door operator mechanism including in combination a main shaft mounted for rotation and adapted to be driven from either a manual or motive power source, a sprocket mounted on said main shaft for movement between first and second positions thereon, means urging said sprocket to said first position where it is rotatively disconnected from said main shaft, manually operable means for moving said sprocket to said second position where it is rotatively connected to said main shaft, means for rotating said sprocket, a motive power source drivingly connected to a drive pulley, means supporting said motive power source which permits same to be moved between first and second positions, a driven pulley, connection means extending between said drive and driven pulley to drivingly interconnect the two when said motive power source is in said first position and when said motive power source is in said second position loosening said connection means to drivingly disconnect the two, a brake member engageable with said connection means in a first position and movable to a second and disengaged position, said motive power source in said second position engaging said brake member to move same to said second and disengaged position, means operably connecting said driven pulley to said main shaft, cable means connected to said means for supporting said motive power source and to said manually operable means for moving said sprocket which cable means when manipulated moves said motive power source to said second position to disengage said drive and driven pulleys and said brake member and to move said sprocket to said second position to rotatively connect same to said main shaft.

6. A door operator mechanism as claimed in claim 5 wherein said cable means comprises a continuous one piece cable member having first and second end portions, first and second cable guides, said first cable guide being located adjacent said means for supporting said motive power source and said second cable guide being located adjacent said manually operable means for moving said sprocket, said cable first end portion engaging said first cable guide and being attached to said means for supporting said motive power source said cable second end portion engaging said second cable guide and being attached to said manually operable means for moving said sprocket.

7. A door operator mechanism as claimed in claim 6 wherein a ring member receives said cable member and a pull chain is connected to said ring for manipulating said cable member.

* * * * *